United States Patent [19]

Chemizard et al.

[11] 4,286,643
[45] Sep. 1, 1981

[54] PNEUMATIC TIRE HAVING A LINING OF PUNCTURE SEALING PRODUCT

[75] Inventors: André Chemizard; Max Blanc, both of Clermont-Ferrand, France

[73] Assignee: Compagnie Generale des Etablissements Michelin, Clermont-Ferrand, France

[21] Appl. No.: 34,965

[22] Filed: May 1, 1979

[30] Foreign Application Priority Data

May 10, 1978 [FR] France .................. 78 14113

[51] Int. Cl.³ .................. B60C 21/08
[52] U.S. Cl. .................. 152/347; 156/115
[58] Field of Search .............. 152/330, 346, 347, 348; 156/115

[56] References Cited

U.S. PATENT DOCUMENTS

| | | | |
|---|---|---|---|
| 1,392,826 | 10/1921 | Gordon et al. | 152/347 |
| 1,482,124 | 1/1924 | Fetter | 152/347 |
| 1,930,182 | 10/1933 | Richardson | 152/347 |
| 1,959,460 | 5/1934 | Crossan | 152/347 |
| 1,977,281 | 10/1934 | Knowlton | 152/347 |
| 2,244,648 | 6/1941 | Carnahan | 152/347 |
| 3,563,294 | 2/1971 | Chien | 152/346 |
| 4,140,167 | 2/1979 | Böhm et al. | 152/346 |

Primary Examiner—John E. Kittle
Attorney, Agent, or Firm—Brumbaugh, Graves, Donohue & Raymond

[57] ABSTRACT

A tire whose inner wall is covered, at least in the zone of the crown and of the shoulders, with a self-sealing product which is pasty at the temperature of the tire in service and which, seen in meridian section, is contained between two layers of elastomer and is divided transversely by partitions of elastomer, is improved due to the fact that the self-sealing product forms at least one continuous ribbon, one end of which is located in the region of one shoulder while the other end is located in the region of the other shoulder of the tire.

3 Claims, 7 Drawing Figures

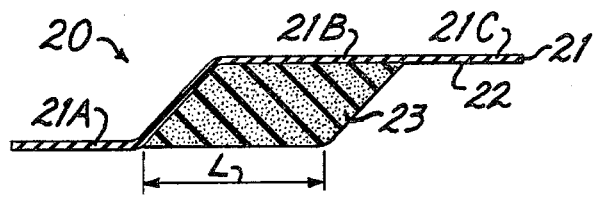
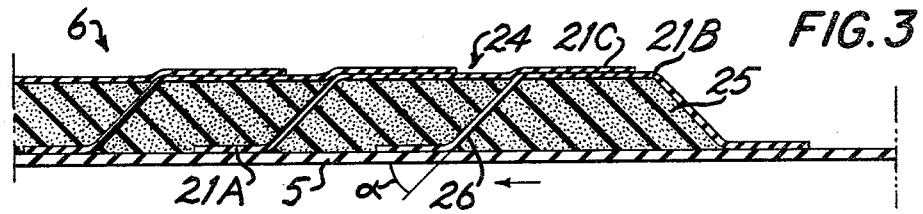
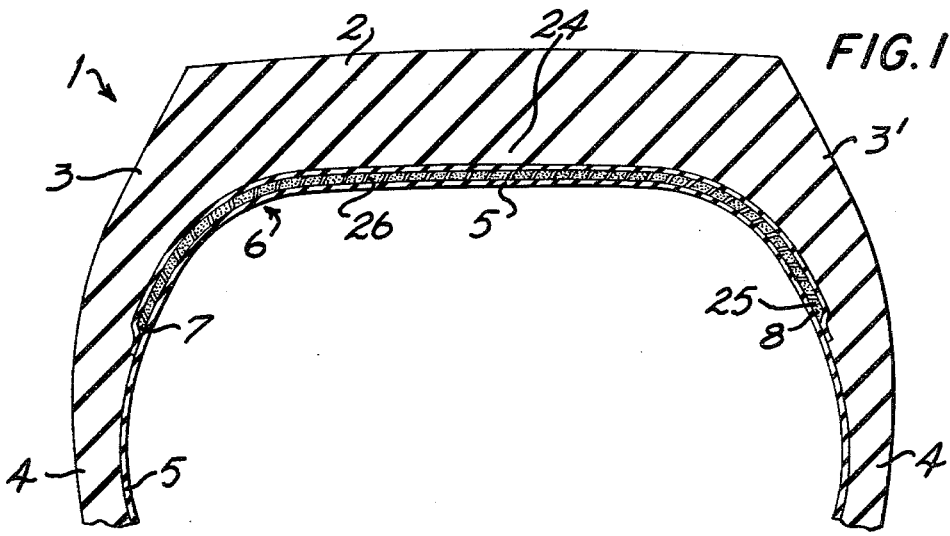
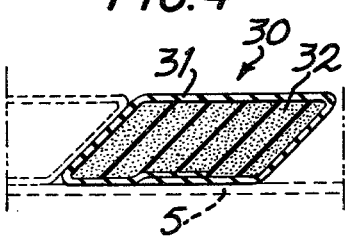
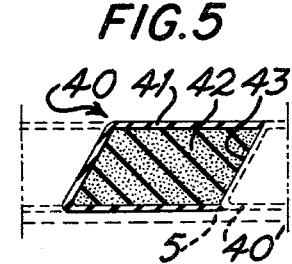
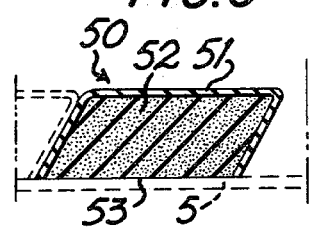
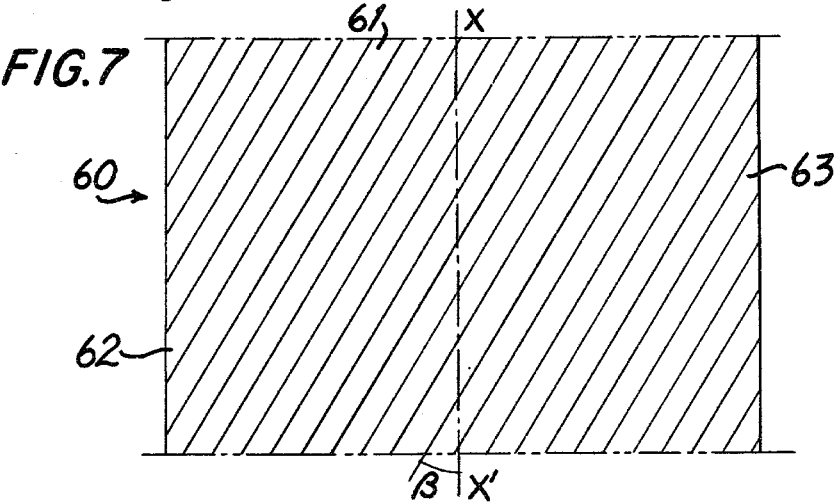

PNEUMATIC TIRE HAVING A LINING OF PUNCTURE SEALING PRODUCT

The present invention relates to tires, the inner wall of which is covered, at least in the zone of the crown and of the shoulders, with a layer of a self-sealing agent which is pasty at the temperature of the tire in service and therefore capable of penetrating into a puncture under the action of the pressure of the air escaping through the puncture.

The self-sealing agent is generally contained between two continuous layers of elastomeric mix. It can be divided transversely into circumferential zones by partitions arranged between the two elastomer layers. This arrangement at times leaves a short segment at the junction of the two ends of a zone where the self-sealing agent is thinned or even discontinuous.

When a hole is produced at the location of such a segment, the risk of a drop in pressure making the continuation of travel impossible is very great. The poorly protected region also produces dynamic imbalance.

The object of the present invention is to eliminate any discontinuity or thinning in the self-sealing inner covering and therefore any risk of dynamic imbalance of the tire or of a flat interrupting travel or jeopardizing of resistance of the tire.

For this purpose, in accordance with the invention, the self-sealing product forms at least one continuous ribbon, one end of which is located in the region of one shoulder while the other end is located in the region of the other shoulder of the tire.

The drawing and the following description which refers thereto are intended to illustrate embodiments of the invention. In the drawings:

FIG. 1 is a view in meridian section of the portion of a tire provided with a partitioned lining developed in accordance with the invention, FIG. 2 shows, in meridian section, on a larger scale than in FIG. 1, a ribbon of open type which can be used to make the lining shown in FIG. 1, FIG. 3 shows, in meridian section, on a larger scale than in FIG. 1, a portion of the partitioned lining made with the ribbon of open type illustrated in FIG. 2, FIGS. 4 to 6 illustrate variant embodiments of ribbons which can be used to make a partitioned lining similar to that shown in FIG. 1, and FIG. 7 is a developed plan view of a partitioned lining, the ribbons of which form a rather large acute angle with the circumferential direction.

In FIG. 1, there can be noted a tire 1 with a crown 2 having a tread which is extended on each side by a shoulder 3,3' followed by a sidewall 4. The inner covering 5 of this tire 1, which in this example is without a separate inner tube, is a mixture having a base of airtight rubber.

In the zone extending from one shoulder 3 or 3' to the other, this inner covering 5 is covered by a partitioned lining 6 of puncture self-sealing product made in accordance with the invention.

A partitioned lining 6 can be made from an open ribbon 20 (FIG. 2) or from an entirely closed ribbon 30 (FIG. 4) or also a partially closed ribbon 40 (FIG. 5) or 50 (FIG. 6).

The open ribbon 20 shown in FIG. 2 comprises a strip 21 formed of an elastomeric mixture, to one face 22 of which there adheres a longitudinal profiled member 23 of parallelogram cross section, formed of a plastic self-sealing product, known per se. The width L of the profiled member 23 is equal to about one-third of the developed width of the strip 21. Thus, this strip 21 protrudes on both sides of the profiled member 23 forming two side flanges 21A and 21C. By juxtaposing a number of turns of the ribbon 20, for instance by winding around the inner covering 5 arranged on a cylindrical building drum (not shown), one can form a partitioned lining 6 which extends, for instance, between the two shoulders 3,3' of the tire 1.

As can be noted from FIG. 3, the flange 21A of the strip 21 covers, backing it, at least the inner covering 5, while the flange 21C covers the central portion 21B of the strip 21 of the preceding turn (in the direction of the laying of the turns indicated by the arrow). The flange 21C and a small fraction of the central portion 21B of the strip 21 together form the covering layer 24 (FIG. 1) of the lining 6.

The trapezoidal shape of the edge profiled member 25 has been obtained by plastic deformation of the profiled member 23 of self-sealing product.

In the case of the ribbon 30 bearing the self-sealing product shown in FIG. 4, the elastomer strip 31 completely surrounds the parallelogram-shaped profiled member 32. On the other hand, the profiled member 42 of self-sealing product in the form of a parallelogram shown in FIG. 5 is surrounded by its strip 41 only on three faces, while its fourth face 43, intended to touch the preceding turn 40'(shown in dashed lines), is without a strip. The parallelogram-shaped profiled member 52 illustrated in FIG. 6 is also surrounded by a strip 51 only on three of its faces, while the fourth face, namely the face 53, adheres directly to the inner covering 5.

When ribbons (20 or 40) in accordance with FIG. 2 or 5 are used, the partitions 26 (FIG. 1) which compartmentalize the lining 6 are each composed of a single thickness of elastomer strip 21 or 41 while when the ribbons (30 or 50) used are of the type shown in FIG. 4 or 6, these partitions are each composed of two thicknesses of strip 31 or 51.

In the embodiments shown in FIGS. 1 to 6 above, the lining 6 is composed of ribbons (such as 20, 30, 40 or 50) wound in contiguous turns which form only a very small angle with the circumferential direction. On the other hand, another embodiment, illustrated in FIG. 7, provides that the lining 60 is composed of ribbons 61 of self-sealing product forming with the circumferential direction X-X' an angle $\beta$ of several degrees or even several tens of degrees. Each of the ribbons 61 may be of the same type as the ribbons 20, 30, 40, or 50 described above.

In the embodiments described, the ribbon used to form the partitioned lining 6 is continuous and has one end 7 (or 62) located in the region of the shoulder 3 of the tire, the other end 8 (or 63) being located in the opposite shoulder 3'.

In the embodiments described above, the angle of inclination $\alpha$ (See FIG. 3) of the partitions 26 is not critical in nature; however, it is preferable, for reasons of ease of winding of the ribbons 20, 30, 40 or 50 around the inner covering 5 on a building drum (not shown) of the tire, for it to be between about 30° and about 50°.

Although the tire described and shown by way of example is of the type without a separate inner tube, it goes without saying that nothing stands in the way of using the invention in the case of a tire having such an inner tube. Also, although the self-sealing product ribbon has been shown in FIGS. 1–6 as forming a profiled member 23, 32, 42, 52 of parallelogram cross section, the self-sealing product ribbon can form a profiled member of rectangular cross section (not shown).

What is claimed is:

1. A tire whose inner wall is covered, at least in the zone of the crown and of the shoulders, with a self-sealing product which is pasty at the temperature of the tire in service and which, seen in meridian section, is contained between two layers of elastomer and is divided transversely by partitions of elastomer, characterized by the fact that the self-sealing product forms at least one continuous ribbon having a parallelogram cross section, one end of which is located in the region of one shoulder while the other end is located in the region of the other shoulder of the tire, the transverse partitions of elastomer having an angle of inclination of between about 30° and about 50°.

2. A tire according to claim 1 characterized by the fact that the layer of elastomer which covers the self-sealing product on the side of the inner cavity of the tire constitutes the airtight inner covering of the tire.

3. The tire according to claim 1, characterized by the fact that the self-sealing product ribbon forms contiguous turns which make only a very small angle with the circumferential direction of the tire.

* * * * *